US011159568B2

(12) United States Patent
Israel et al.

(10) Patent No.: US 11,159,568 B2
(45) Date of Patent: Oct. 26, 2021

(54) ACCOUNT MANAGEMENT USING ACCOUNT ACTIVITY USAGE RESTRICTIONS

(71) Applicant: Microsoft Technology Licensing, LLC, Redmond, WA (US)

(72) Inventors: Moshe Israel, Herzelia (IL); Ben Kliger, Ramat-Gan (IL); Royi Ronen, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 16/014,892

(22) Filed: Jun. 21, 2018

(65) Prior Publication Data
US 2019/0394240 A1    Dec. 26, 2019

(51) Int. Cl.
*H04L 29/06*    (2006.01)

(52) U.S. Cl.
CPC ............ *H04L 63/20* (2013.01); *H04L 63/107* (2013.01); *H04L 63/108* (2013.01); *H04L 63/1416* (2013.01)

(58) Field of Classification Search
CPC ..... H04L 63/20; H04L 63/107; H04L 63/108; H04L 63/1416; H04L 63/1408; H04L 63/102; G06F 21/316; G06F 21/554
USPC .......................................................... 726/1
See application file for complete search history.

(56) References Cited

U.S. PATENT DOCUMENTS

| | | | |
|---|---|---|---|
| 6,400,270 B1 | 6/2002 | Person | |
| 9,185,095 B1 | 11/2015 | Moritz et al. | |
| 9,349,014 B1 | 5/2016 | Hubing et al. | |
| 9,485,271 B1 * | 11/2016 | Roundy | H04L 63/1441 |

(Continued)

FOREIGN PATENT DOCUMENTS

| | | |
|---|---|---|
| EP | 1200940 A2 | 5/2002 |
| EP | 3370366 A1 | 9/2018 |

(Continued)

OTHER PUBLICATIONS

Anjos, et al., "A Model for Security Management of SCADA Systems", In Proceeding of International Conference on Emerging Technologies and Factory Automation, Sep. 15, 2008, pp. 448-451.

(Continued)

*Primary Examiner* — Mohammad W Reza
(74) *Attorney, Agent, or Firm* — Newport IP, LLC; Jacob P. Rohwer

(57) ABSTRACT

Methods, systems, and media are shown for reducing the vulnerability of user accounts to attack that involve creating a rule for a user account that includes a permitted parameter corresponding to a user account activity property, monitoring the account activity of the user account. If it is determined that account activity property is inconsistent with the permitted parameter, then the user account is disabled. An example of a permitted parameter is a permitted time period, such as a start time, an end time, a recurrence definition, a days of the week definition, a start date, an end date, and a number of occurrences definition. Other examples are a physical parameter, such as a permitted geographic location, (Continued)

device, or network, or a permitted usage parameter, such as a permitted application, data access, or domain.

15 Claims, 11 Drawing Sheets

(56) References Cited

U.S. PATENT DOCUMENTS

| | | | |
|---|---|---|---|
| 2011/0307403 A1* | 12/2011 | Rostampour | G06Q 50/01 705/325 |
| 2012/0166553 A1 | 6/2012 | Rubinstein et al. | |
| 2012/0278881 A1* | 11/2012 | Mann | G06F 21/6218 726/17 |
| 2013/0232541 A1* | 9/2013 | Kapadia | G06F 21/40 726/1 |
| 2014/0157382 A1* | 6/2014 | Ford | G06F 21/36 726/7 |
| 2014/0196075 A1* | 7/2014 | Park | H04N 21/43615 725/30 |
| 2014/0237576 A1* | 8/2014 | Zhang | G06F 21/32 726/7 |
| 2015/0121461 A1* | 4/2015 | Dulkin | H04L 63/1408 726/4 |
| 2015/0199500 A1* | 7/2015 | Jagtap | G06F 21/45 726/1 |
| 2017/0048260 A1 | 2/2017 | Peddemors et al. | |
| 2017/0063873 A1 | 3/2017 | Hidden et al. | |
| 2017/0251008 A1 | 8/2017 | Andreeva et al. | |
| 2018/0033089 A1 | 2/2018 | Goldman et al. | |

FOREIGN PATENT DOCUMENTS

| | | |
|---|---|---|
| WO | 2008094161 A1 | 8/2008 |
| WO | 2016177437 A1 | 11/2016 |
| WO | 2017099342 A1 | 6/2017 |

OTHER PUBLICATIONS

Bannister, R M., "Directory-Based Information Services: Password Policies", In Standard Working Draft of Internet Engineering Task Force, Bannister Prose Consulting Ltd, Mar. 11, 2014, 13 Pages.

Bulusu, et al., "Addressing Security Aspects for HPC Infrastructure", In Proceeding of Information and Computer Technologies, Mar. 23, 2018, pp. 27-30.

Hamidreza, et al., "Machine-Type Communications: Current Status and Future Perspectives Toward 5G Systems", In Journal of IEEE Communications Magazine, vol. 53, No. 7, Sep. 16, 2015, pp. 10-17.

Hazlewood, et al., "Improved Grid Security Posture Through Multifactor Authentication", In Proceeding of 12th International Conference on Grid Computing, Sep. 21, 2011, 8 Pages.

"International Search Report and Written Opinion Issued in PCT Application No. PCT/US2019/037127", dated Sep. 11, 2019, 20 Pages.

* cited by examiner

ACCOUNT MANAGEMENT USING ACCOUNT ACTIVITY USAGE RESTRICTIONS

BACKGROUND

With the emergence of services and solutions provided through the Internet using remote computer resources, such as cloud based solutions, has led to a proliferation of user accounts that may be vulnerable to attack from malicious actors. For example, there are huge numbers of accounts for email, financial, fitness, media and many other services and cloud-based applications that are accessible by users using the Internet. In addition, the Internet of Things ("IoT") has introduced billions of devices that are connected to the Internet and may be vulnerable to attack, such as smart phones, smart watches, and smart embedded devices. The number of accounts and devices that are exposed to attack can be viewed as a surface area for attack. The greater the number of exposed accounts and devices, the greater the surface area available to an attacker.

As a result of the large number of potentially vulnerable accounts and devices, there is an increase in the use by malicious actors of automatic tools to scan the Internet to find a vulnerable account or device and, for example, malicious applications on victim machines. One of the most common automatic methods that attackers use to attempt to gain access to a machine is by brute-force attacking the machine by repeatedly using multiple usernames and passwords until an attempt to breach an account is successful.

Once the attacks successfully access one machine, the attackers often use the compromised user account on one machine to laterally attack other machines, systems and services. Once an attacker has obtained valid credentials for a user account, the attacker may use the credentials to remotely access a system and then use remote access tools to move laterally through the system to harvest additional credentials, search for sensitive information, inject malware, and access other domains, devices and data. For example, the attacker may utilize the user account they initially penetrate to jump to other machines and attempt to obtain more usernames and passwords that are available on the other machines.

In another example, an attacker proactively uses non-sensitive accounts to gain access to sensitive accounts. The attacker uses the non-sensitive account to identify administrators in a network and the machines that the administrators access. They may then access data in domain controllers to attempt to discover accounts and the access to resources and files for the accounts as well as obtaining credentials for other users that are stored on computers that have already been compromised. The attacker may then use stolen credentials to move laterally across users and resources to obtain administrative privileges in the network.

The vulnerability of many millions of user accounts presents a serious security risk. For example, financial or personal information may be taken and sold or utilized to steal funds. Infrastructure can be attacked through compromised accounts on devices. Important information for public and private entities can be stolen, corrupted or destroyed.

It is with respect to these and other technical challenges that the disclosure made herein is presented.

SUMMARY

Restricting or removing user accounts when the accounts are not required can significantly decrease the attack surface, e.g. the number of potentially vulnerable accounts exposed to attackers, and restrict an attacker's penetration or movement. The disclosed technology limits account activity to specified times, dates, infrastructure, locations or usage to reduce the number of accounts or the accessibility of an account.

For example, user accounts can be activated or deactivated on-demand or responsive to a specific user need. The user accounts can be local users or domain joined users. Examples of demand criteria can be a manual demand, e.g. an account that can only be accessed once, a scheduled access timeline, e.g. a work account only accessible during working hours, or limited to a specific need, such as an account that can only run specific applications.

The present technology reduces the attack surface for a system or machine by limiting account activity to reduced time windows, infrastructure, locations or usage. When fewer accounts are accessible and/or accounts are accessible for more limited times, the vulnerability of the system or machine is reduced. Other technical benefits not specifically mentioned herein can also be realized through implementations of the disclosed subject matter.

In order to realize the technical benefits mentioned briefly above, implementations of the technologies disclosed herein can manage user accounts to improve the security of computer systems by creating a rule for a user account that includes a permitted parameter corresponding to a property of account activity on the user account. The account activity of the user account is monitored to determine whether a property of the account activity of the user account is inconsistent with the permitted parameter of the rule and, if so, disable the user account.

In one example, the permitted parameter of the rule is a permitted time period and the property of the account activity of the user account that is monitored is a time of use. The determination of whether the property of the account activity of the user account is inconsistent with the permitted parameter of the rule involves determining whether the time of use of the user account is outside the permitted time period of the rule.

In this example, the permitted time period can include a start time, an end time, a recurrence definition, a days of the week definition, a start date, an end date, or a number of occurrences definition. The time of use property can include a time of the account activity, a date of the account activity, a day of the week of the account activity, or a number of occurrences of the account activity. The determination whether the property of the account activity of the user account is inconsistent with the permitted parameter of the rule can involve determining whether the time of the account activity is inconsistent with the start time or the end time, the date of the account activity is inconsistent with the recurrence definition, the start date, or the end date, the day of the week of the account activity is inconsistent with the days of the week definition, or the number of occurrences of the account activity is inconsistent with the number of occurrences definition.

In another example, the permitted parameter of the rule can be a physical parameter and the property of the account activity of the user account is a physical property of the account activity. The determination of whether the property of the account activity of the user account is inconsistent with the permitted parameter of the rule involves determining whether the physical property of use of the user account is outside the physical parameter of the rule.

In this example, the physical parameter can include a permitted geographic location, a permitted device, or a permitted network. The physical property of the account activity of the user account can a geographic location where the account activity occurs, a device used for the account activity, or a network used for the account activity. The determination of whether the property of the account activity of the user account is inconsistent with the permitted parameter of the rule can involve determining whether the geographic location where the account activity occurs is inconsistent with the permitted geographic location, the device used for the account activity is inconsistent with the permitted device, or the network used for the account activity is inconsistent with the permitted network.

In still another example, the permitted parameter of the rule can be a permitted usage parameter and the property of the account activity of the user account comprises a usage property of the account activity. The determination of whether the property of the account activity of the user account is inconsistent with the permitted parameter of the rule can involve determining whether the usage property of the account activity of the user account is outside the permitted usage parameter of the rule.

In this example, the permitted usage parameter can include a permitted application, a permitted data access, or a permitted domain. The usage property of the account activity of the user account can include an application used for the account activity, a data access of the account activity, or a domain access of the account activity. The determination of whether the property of the account activity of the user account is inconsistent with the permitted parameter of the rule can include determining whether the application used for the account activity is inconsistent with the permitted application, the data access of the account activity is inconsistent with the permitted data access, or the domain access of the account activity is inconsistent with the permitted domain.

As discussed briefly above, implementations of the technologies disclosed herein, can make computer systems less vulnerable to attack thereby avoiding inefficiencies due to compromised and corrupted computer resources. More secure computer systems will result in higher availability and efficiency of computer resources for authorized users of the computer systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
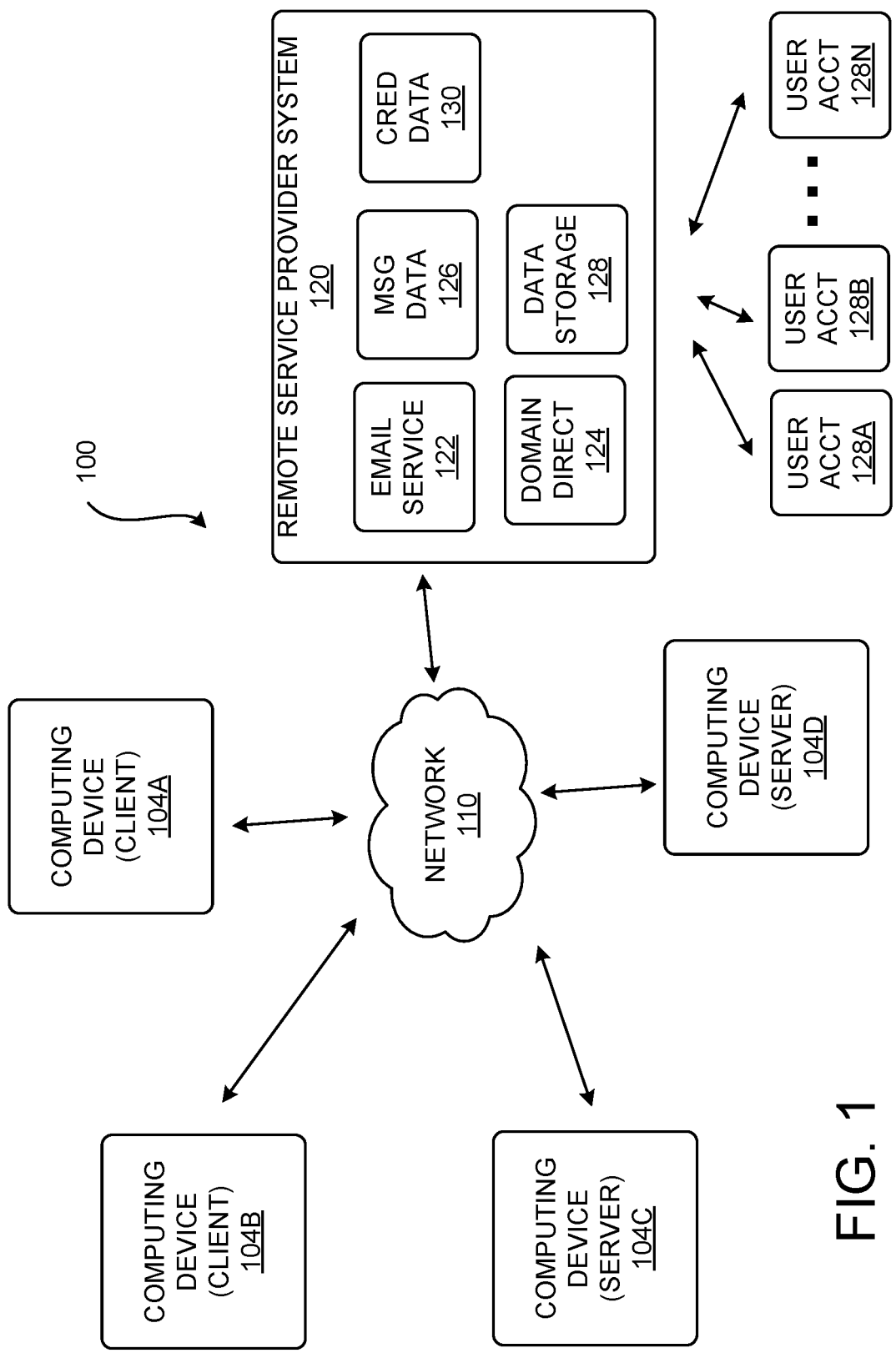
FIG. 1 is a network architecture diagram showing an illustrative computing system involving user accounts hosted on a remote service provider system.

The following detailed description is directed to a remote service provider system for defining and applying account rules to control access to the system. As discussed briefly above, the extensive number of user accounts and devices that may access a remote service provider system creates an attack surface that is managed in the disclosed technologies. The security of a remote service provider system can be improved by the disclosed approach to managing user accounts to reduce an attack surface of the remote service provider system. The improved system security of the disclosed approach can yield significant benefits to a remote service provider in terms of protection of resources and data, which improves resource utilization, availability and overall performance.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of a remote service provider system that provides improved security will be described.

FIG. 1 is a network architecture diagram showing an illustrative remote computing environment 100 involving user or server computing devices 104 in combination with a remote service provider system 120. In this example, computing devices 104A and 104B are client devices, such as personal computers, laptop computers, tablet computers, or smart phones, and computing devices 104C and 104D are servers, such as servers operated and maintained by a customer on their own premises. The client devices 104A and 104B and server devices 104C and 104D, in this example, are in communication with the resources of remote email service provider system 120 through network 110.

Remote service provider system 120, in this example, includes an email service module 122, a domain directory 124, message data 126, such as for text or voice messages, data storage 128 for storing user application and operational data, and credential data store 130 for storing data related to credentials for user accounts 128.

The remote service provider system 120 is configured to provide services to users of computing devices 104, such as email messaging, text messaging, remote applications, remote storage, etc., through network 110. For example, a user with a user account 128 can login to remote service provider system 120 through network 110 in order to utilize email service 122.

An attacker can also utilize a computing device 104 to attempt to login to or access remote service provider system 120 through network 110. As discussed briefly above, in a brute force attack technique, an attacker will repeatedly try to login to the remote service provider system with a variety of user names or account identifiers and passwords with the intent of finding a set of credentials, e.g. user name and password combination, that allows them to access an account. Automated techniques have been developed by attackers to generate and attempt login with large numbers of user name and password combinations. The more user accounts that are available and active on the remote service provider system 120, then the greater the probability that an attacker may find a valid user name and password combination.

Note that the remote service provider system discussed herein may be implemented using remote computer resources, e.g. the "cloud," to perform computer processing, such as to respond to user control inputs or other data input. In some cloud computing scenarios, some operations may be implemented in one set of computing resources, such as clients and servers, and other operations may be implemented in other computing resources, such as cloud resources provided by one or more compute resource providers. A cloud computing environment may include many computer resource provider systems offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

Once an attacker has obtained valid user credentials that give them access to the remote service provider system, they will typically use these credentials to laterally attack through the system attempting to access other system resources, such as other machines, systems, data and services. For example, the attacker may use remote access tools to move laterally through the system to harvest additional credentials, search for sensitive information, inject malware, and access other domains, devices and data.

For instance, an attacker may attempt to identify administrators in a network and the machines that the administrators access. They may also attempt to access data in domain controllers to discover accounts and obtain access to resources and files for the accounts. An attacker may also search for credentials for other users that are stored on computers that have already been compromised. The attacker may then use these stolen credentials to move laterally across users and resources to obtain administrative privileges in the network.

Figure 2:
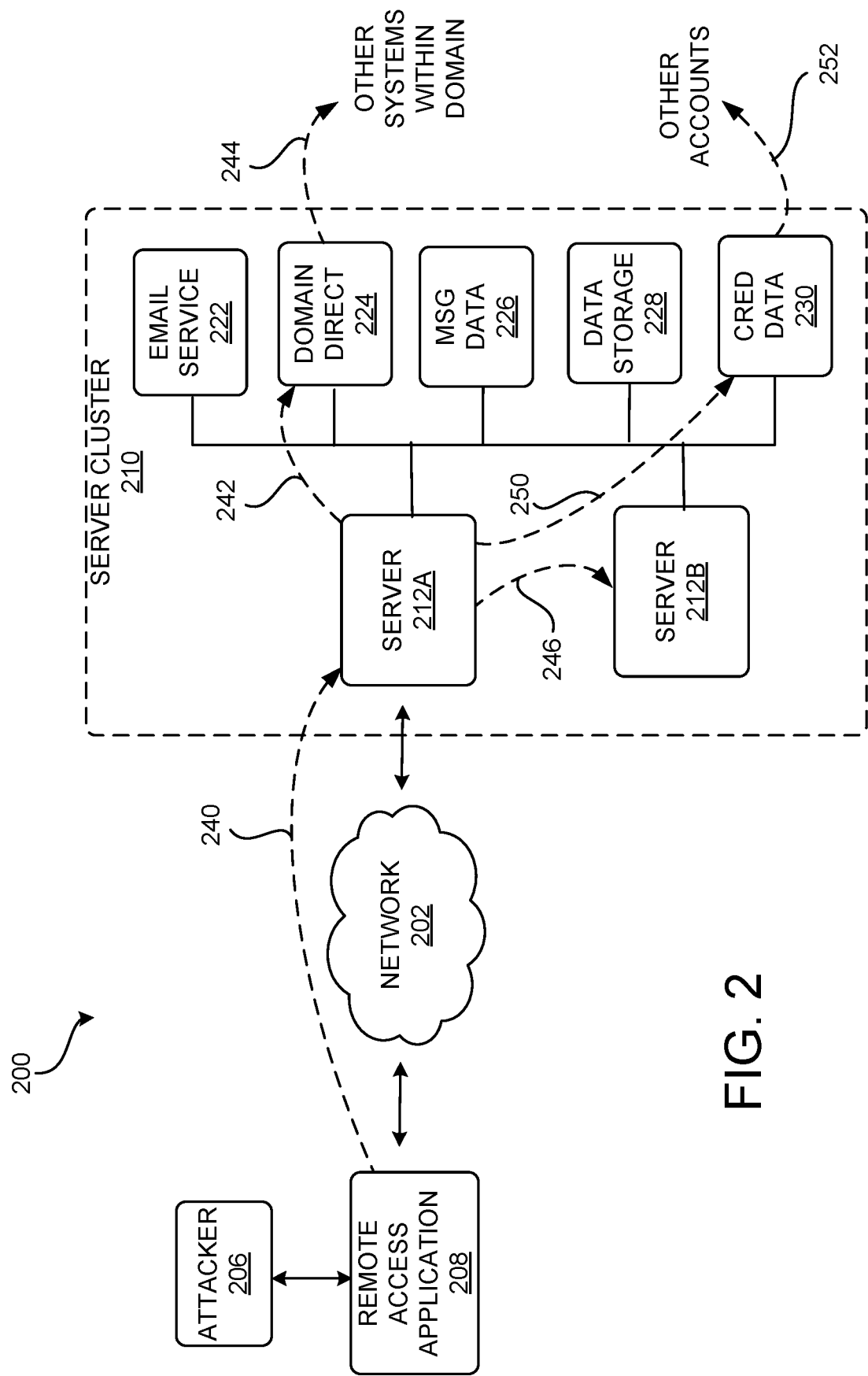
FIG. 2 is a software architecture diagram showing an illustration of a lateral attack in a server cluster for a remote service provider system.

FIG. 2 is a software architecture diagram showing an illustration of a lateral attack in a server cluster 210 for a remote service provider system. In this example, attacker 206 using a remote access application 208 using stolen user credentials gains access, at 240, to an account in server cluster 210 through server 212A. The attacker then uses the access obtained using the comprised account to access, at 242, domain directory 224 to identify other device or systems within the domain for attack. The attacker may use the compromised account to laterally attack, at 246, another server 212B in cluster 210. Or the attacker may, at 250, gain access to credential data store 230 to obtain credentials for other accounts, which the attacker will use to access the data and resources for those accounts.

An attacker may also search communications data such as email messages in email service 222 or text or voice messages in message data 226 to obtain, for example, sensitive information, such as compromising communications, or additional user account names to use in additional brute force attacks. The attacker may obtain access through a compromised account to sensitive data in data storage 228, such as documents, personal records, or financial transactions.

Figure 3A:
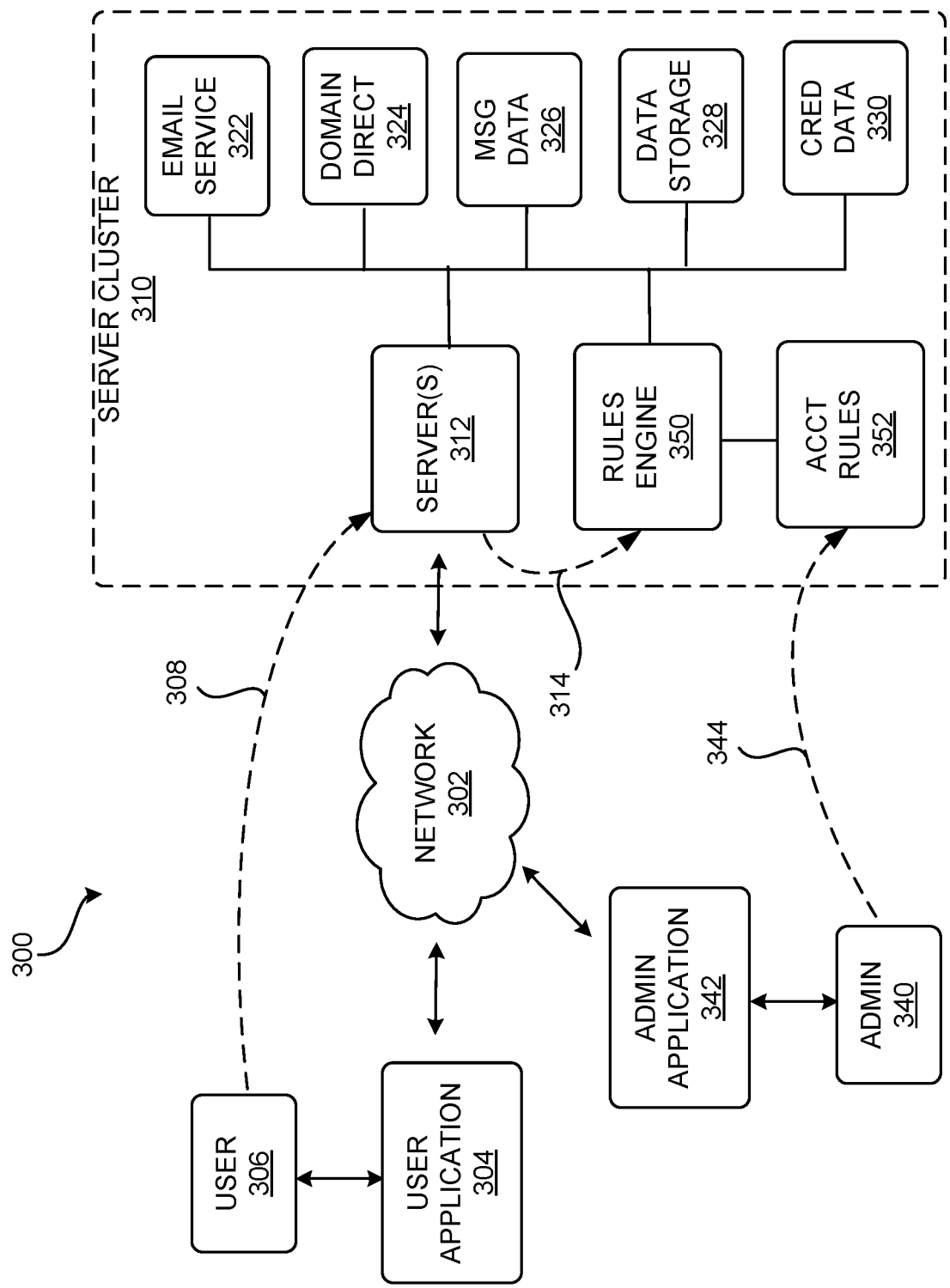
FIG. 3A is a software architecture diagram showing an illustration of a server cluster for a remote service provider system that utilizes account rules, according to one embodiment.

FIG. 3A is a software architecture diagram showing an illustration of a server cluster 310 for a remote service provider system that utilizes account rules, according to one embodiment of the disclosed technologies. In this example, server cluster 310, like server cluster 210 of FIG. 2, includes email service 322, domain directory 324, message data 326, data storage 328 and credential data 330.

In addition, server cluster 310 includes rules engine 350, which accesses account rules in account rules store 352. A administrative user interface is provided to an administrator 340 for the server cluster, such as administrative application 342. Administrative application 342 enables administrator 340 to define, at 344, the account rules in account rules store 352.

A user 306 using user application 304 generates account activity, such as a login or access attempt, at 308, server cluster 310 via one of the servers 312 in the cluster. The user's account identifier, e.g. user name, is submitted, at 314, to rules engine 350. Rules engine 350 uses the account identifier to determine if any account rules in account rules store 352 are relevant to the account identifier. For example, an account rule may be defined that pertains to the specific account identifier or to a domain to which the account identifier belongs. Rules engine 350 applies the relevant account rules to the account identifier of the user's login attempt to determine whether a rule is triggered that requires the user's account to be blocked. Note that rules engine 350 can be a process executing within on of the servers 312 or other components of server cluster 310.

Figure 3B:
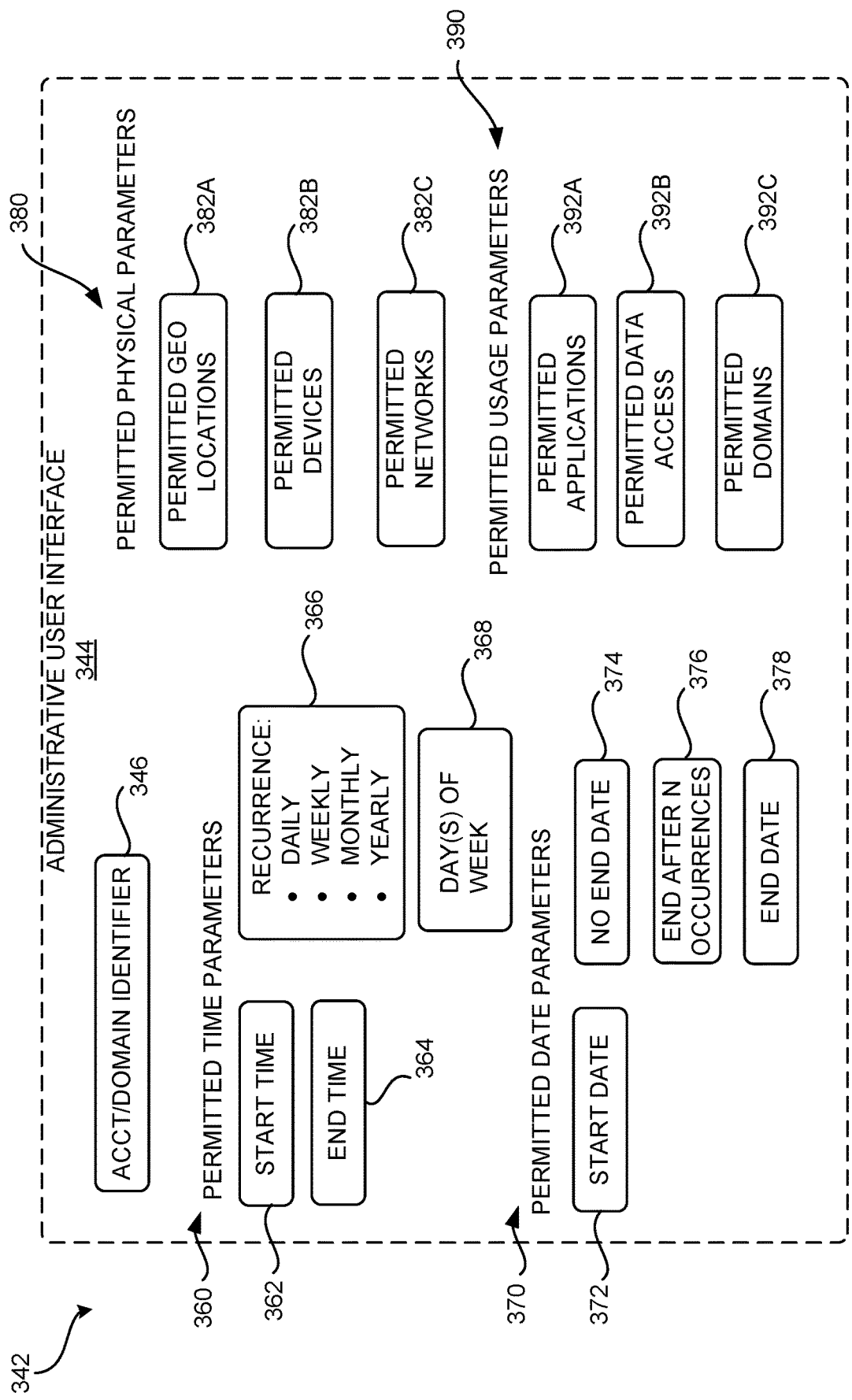
FIG. 3B is a schematic diagram showing an illustration of an administrator user interface for defining account rules in a remote service provider system, according to one embodiment.

FIG. 3B is a schematic diagram showing an illustration of an administrator user interface 344, such as may be presented to an administrator via administrator application 342, that enables an administrator to define account rules in an account rules store for a remote service provider system, according to one embodiment of the disclosed technologies. For example, interface 344 can be presented to the administrator when an administrator creates an account or domain. Alternatively, interface 344 can be utilized to create a rule for an existing account or domain. In another example, interface 344 can be used by the administrator to define a rule applying to a domain, in which case the rule would apply to accounts already in existence within the domain and future accounts that are created within the domain.

Administrative user interface 344 includes an account or domain identifier field 346 that identifies the account or domain to which the rule is to be applied. Interface 344 may include time parameters that define when an account or domain can be accessed. In this example, interface 344 includes permitted time parameter fields 360 that can define a start time 362 and end time 364 for the rule as well as a recurrence schedule 366, e.g. daily, weekly, monthly or yearly, or defined days of the week 368 when access is permitted, e.g. Monday through Friday.

For example, a user account identified in field 346 can have permitted time parameters that allow the user account to be accessed starting at 8:00 AM, field 362, ending at 5:00 PM, field 364, on a daily basis, field 366. The remote service provider system will deny access to the account during times outside of the periods defined by the permitted time parameters.

Administrative user interface 344 can also include permitted data parameters 370, such as fields defining a start date 372 along with a defined end date. Selection of field 374 can be used to define an open ended rule without an end date. Field 376 can be used to define a number N of occurrences of access to the account before termination, e.g. terminate access using the account after the account has been accessed N times. Field 378 can be used to define a date certain for the end date after which the account or domain will be inaccessible.

For example, an account identified in field 346 can have a start date defined in field 372 that coincides with an employee's start date and with field 374 selected so that the account has no end date. In another example, a student account can have a start date defined in field 372 that coincides with a start date for a class and an end date defined in field 378 that coincides with a last date of the class. In yet another example, an account can be defined with N=1 so that the account can be accessed only once.

Administrative user interface 344 can also include permitted physical parameters 380. For example, field 382A can define a geographic zone from which the account can be accessed. Field 382B can define one or more devices from which the account can be accessed. Field 382C can define one or more network domains from which the account can be accessed.

For example, an account identified in field 346 can have a geographic zone for the United States defined in field 370 and the account can only be accessed from within the United States. In another example, an employee's work computer can be defined in field 382B such that the account can only be accessed from the work computer. In still another example, a corporate network domain can be defined in field 382C such that the account can only be access from within the corporate network.

Administrative user interface 344 can also include permitted usage parameters 390. For example, field 392A can define specific applications that the account can access. Field 392B can define data stores or data domains that the account can access. Field 392C can define one or more domains that the account can access.

For example, an account identified in field 346 can limited to using a word processing application and a database application defined in field 392A. In another example, the account can be limited to accessing a human resources database defined in field 392B. In still another example, the account is limited to accessing a corporate domain defined in field 392C.

It should be readily recognized that a wide variety of different parameters can be defined for a rule beyond those illustrated in the example of FIG. 3B without departing from the scope of the present disclosure.

Figure 4:
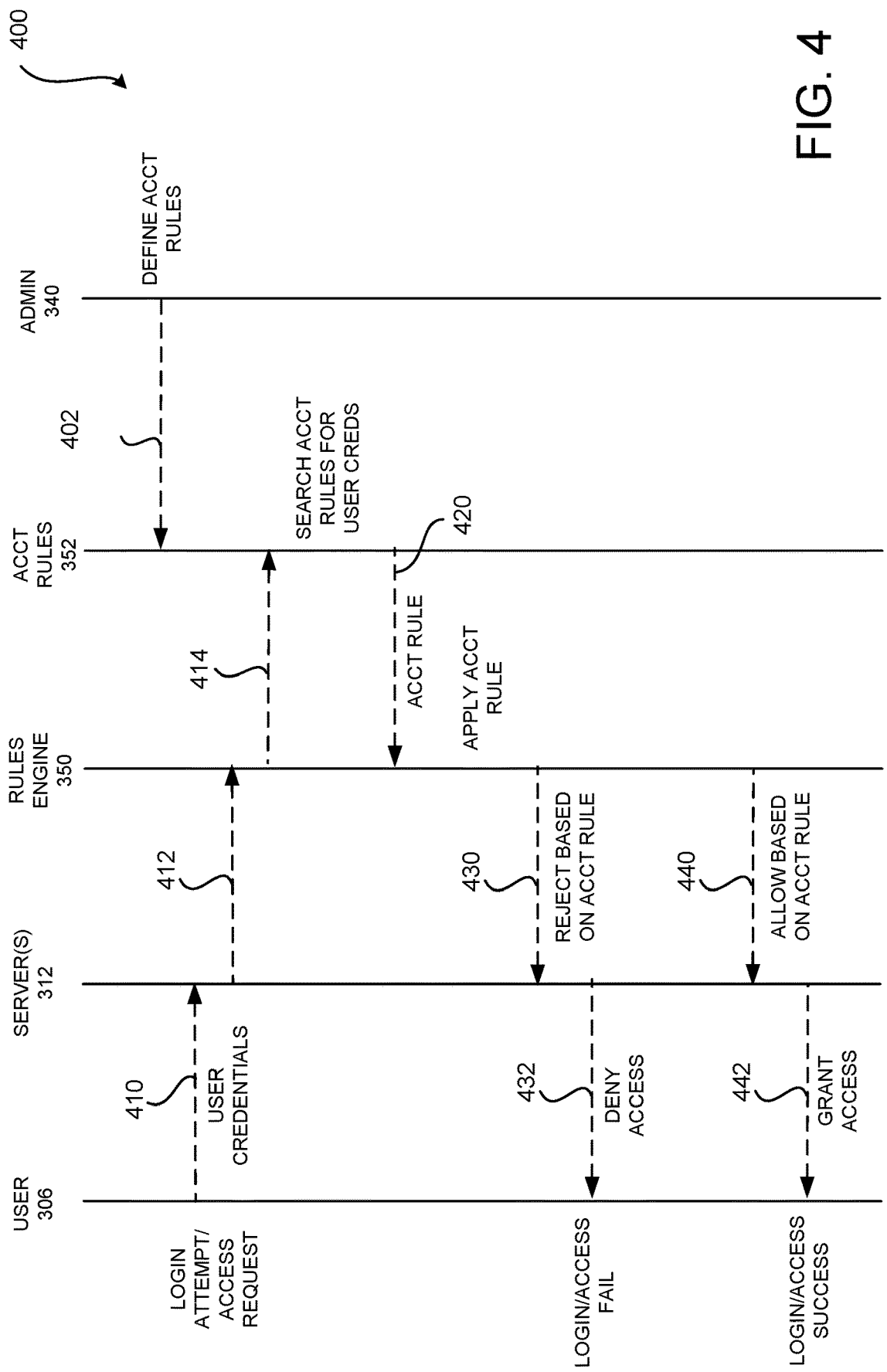
FIG. 4 is a messaging diagram showing an illustration of message transfer in a remote service provider system that utilizes account rules, according to one embodiment.

FIG. 4 is a messaging diagram showing an illustration of message transfer 400 in a remote service provider system that utilizes account rules, according to one embodiment. In this example, at 402, administrator 340 utilizes administrative application 342 of FIG. 3A and administrative user interface 344 of FIG. 3B to define one or more account rules relating to account or domain identifiers that are stored in account rules store 352.

At 410, user 306 in FIG. 3A generates account activity, such as by sending a login attempt or access request to server 312 along with the user's credentials. At 412, server 312 sends the account identifier from the user's credentials to rules engine 350. At 414, rules engine 350 uses the account identifier to search account rules store 352 for one or more rules pertaining to the account identifier, e.g. a rule with a matching the account identifier or a rule with a domain identifier that pertains to the account identifier. At 420, rules engine 350 obtains a relevant account rule from account rules store 352 and applies the rule to the account identifier.

At 430, in this example, if the current account activity properties fail the rule, e.g. the login attempt is being made outside of the permitted time parameters defined in the account rule, rules engine notifies server 312 that the login or access attempt is rejected. At 432, server 312 sends a message to user 306 denying the login or access attempt.

If the current account activity properties for the login attempt pass the rule, e.g. the login attempt is being made within of the permitted time parameters defined in the account rule, rules engine notifies server 312, at 440, that the login or access attempt is allowed. At 442, server 312 sends a message to user 306 granting the login or access attempt.

It will be appreciated that the architecture and messaging shown in the examples associated with FIGS. 3A and 4 are illustrative and do not limit the scope of the disclosed technology. One of skill in the art will readily recognize that other architectures and message protocols may be utilized in keeping with the disclosed technology.

Figure 5A:
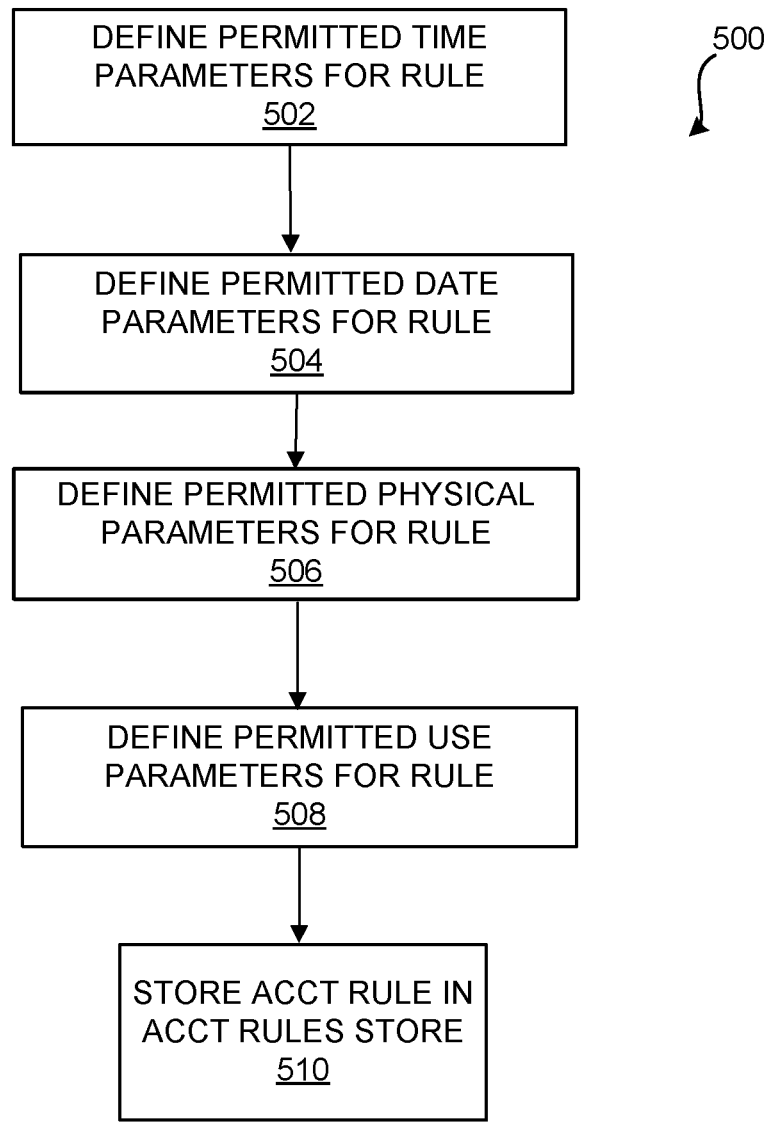
FIG. 5A is a flow diagram showing a routine that illustrates aspects of the operation of defining account rules in the remote service provider system illustrated in FIG. 3A utilizing the administrative user interface of FIG. 3B, according to one embodiment disclosed herein.

FIG. 5A is a flow diagram showing a routine that illustrates aspects of process 500 for defining an account rule in the remote service provider system illustrated in FIG. 3A utilizing the administrative user interface of FIG. 3B, according to one embodiment disclosed herein. In this example, process 500 is invoked in the context of administrator 340 utilizing administrative application 342 with administrative user interface 344 to define one or more account rules to be stored in account rules store 352.

At 502, the administrative user interface 344 is used to define permitted time parameters 360 for the account rule. At 504, interface 344 is utilized to define permitted date parameters 370 for the account rule. At 506, interface 344 is utilized to define permitted physical parameters 380 for the account rule. At 508, interface 344 is utilized to define permitted use parameters 390 for the account rule. At 510, the account rule is stored in the account rules store 352.

One of skill in the art will readily appreciate that a variety of approaches may be utilized to define the account rules without departing from the scope of the disclosed technology.

Figure 5B:
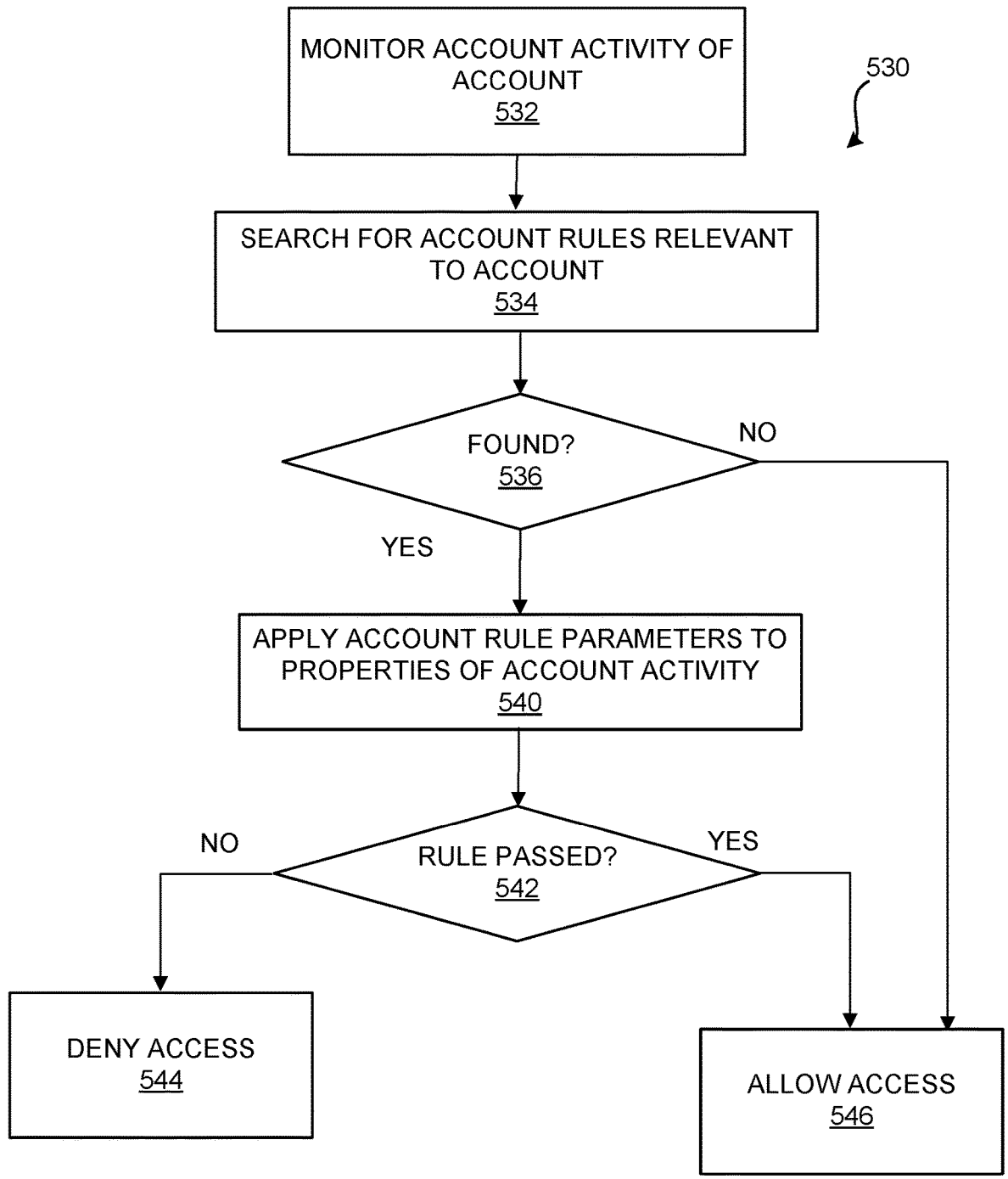
FIG. 5B is a flow diagram showing a routine that illustrates aspects of the operation of the remote service provider system illustrated in FIG. 3A that utilizes account rules, according to one embodiment disclosed herein.

FIG. 5B is a flow diagram showing a routine that illustrates aspects of a process 530 of the remote service provider system 300 shown in FIG. 3A that utilizes account rules, according to one embodiment disclosed herein. At 532, the process monitors activity of an account, e.g. by analyzing the current account activity properties of the account. For example, the process detects a login attempt or an access attempt by a user account. At 534, when activity is detected on the account, the account identifier for the account is used to search for one or more account rules that are relevant to the account. For example, an account rule in the account rules is defined for the account identifier or a domain relevant to which the account identifier belongs. Note that there may be more than one account rule that is relevant to the user credentials. For example, one rule defined for the account identifier and another rule defined for a domain to which the account belongs.

If no relevant account rule is found, then control branches, at 536, to 546, where the user is allowed access, which may include a conventional authorization operation. If a relevant account rule is found, then control branches, at 536, to 540 and the parameters of the account rule are applied to the current account activity properties of the account activity, e.g. time, date, location, user machine, etc.

If the rule applied at 540 is passed, e.g. the current account activity properties fall within the permissible parameters defined in the account rule, then control branches to 546 where the account activity is allowed, e.g. completion of a login attempt or respond to an access request. If the rule is not passed, then control branches to 544 where the account activity is denied, e.g. the login attempt is denied or access request is blocked.

Note that if multiple account rules are relevant to the account, then each of the multiple rules is applied to the account activity properties. If the account activity violates a parameter of one of the multiple account rules, then access is denied.

Figure 5C:
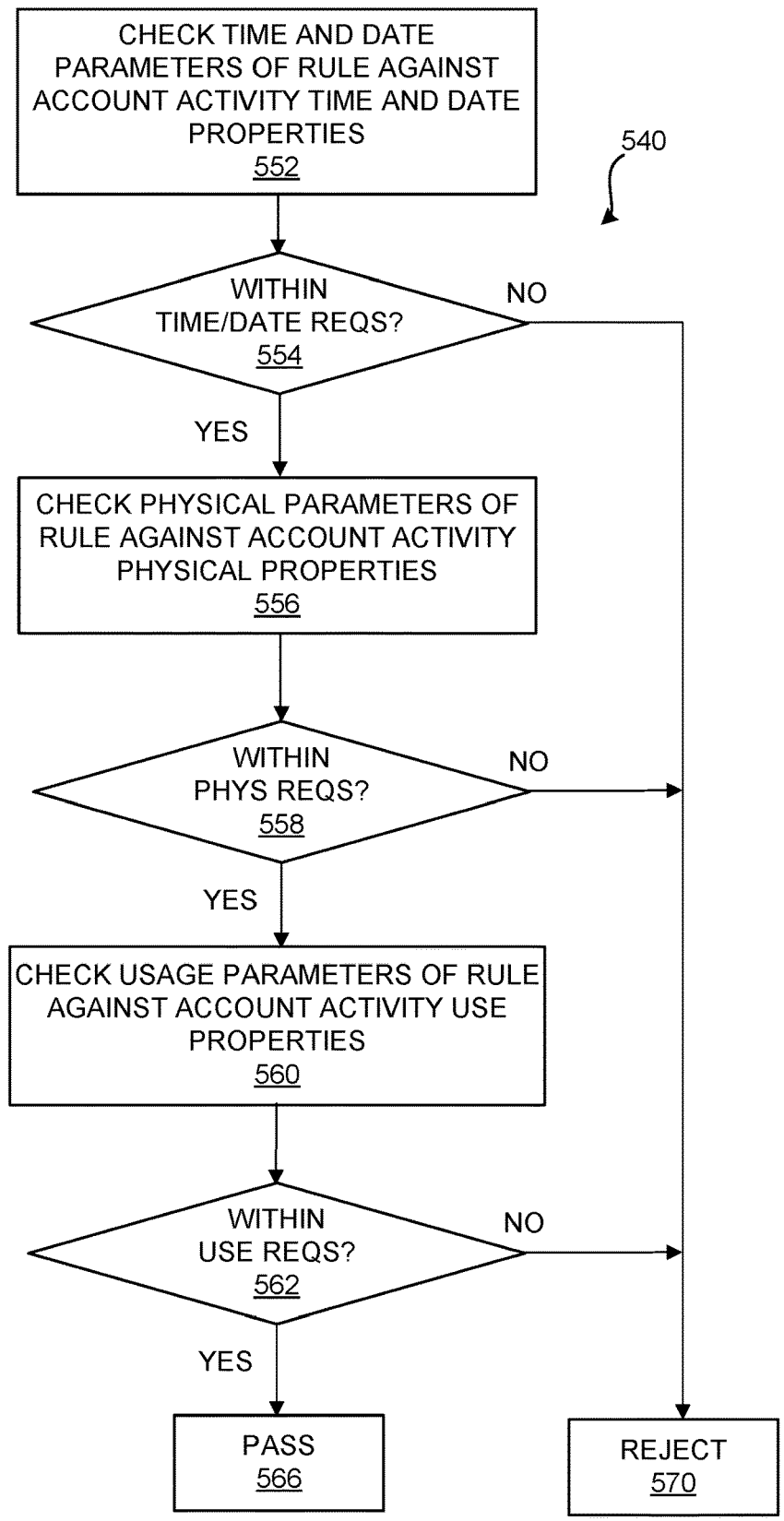
FIG. 5C is a flow diagram showing a routine that illustrates aspects of applying account rules in the remote service provider system illustrated in FIG. 3A to a login or access attempt illustrated in FIG. 4, according to one embodiment disclosed herein.

FIG. 5C is a flow diagram showing one example of an operation for applying account rules to account activity properties at 540 in FIG. 5B that illustrates aspects of applying account rules in the remote service provider system illustrated in FIG. 3A to account activity, e.g. a login or access attempt, illustrated in FIG. 4, according to one embodiment disclosed herein.

At 552, the permitted time and date parameters, if any, defined for the account rule being applied are checked against the time and date account activity properties, e.g. the time and date of the user login or access attempt. For example, if the rule defines time parameters permitting access between 8:00 AM and 5:00 PM and date parameters that permit access Monday through Friday, then the time and date properties of a login attempt are checked against the time and date parameters defined in the rule. If the time or date properties of the login attempt are not within the time and date parameter requirements of the rule, then control branches, at 554, to 570, where the login attempt is rejected. If the account activity properties are within the time and date parameter requirements, then control branches, at 554, to 556.

At 556, the permitted physical parameters, if any, defined for the account rule being applied are checked against the physical properties for the account activity. For example, if the rule requires the account to use a specific machine, then a machine used by a user for a login attempt is checked against the machine parameter defined in the account rule. If the machine property, e.g. the machine used for the login attempt, does not match the machine parameter defined in the account rule, then control branches, at 558, to 570, where the login attempt is rejected. If the machine property does match the defined machine parameter, then control branches, at 558, to 560.

At 560, the permitted usage parameters, if any, defined for the account rule being applied are checked against the usage properties for the account activity. For example, if the rule limits the account to use of specific applications, then an application usage property of the account activity, e.g. launching a word processing application, is checked against a permitted applications parameter defined for the account rule. If the application usage property of the account activity does not match the permitted applications parameter of the account rule, then control branches, at 562, to 570, where the account activity is rejected. If the application usage property does match the permitted applications parameter of the account rule, then control branches, at 562, to 566, where the account is passed, e.g. accepted for processing by the remote services provider system.

By limiting the availability and/or use of a user account, the disclosed technology reduces the exposure of user accounts to malicious attack. If, for example, a user account can only be accessed for 8 hours a day, then the exposure of that user account to attack is reduced to one third of the exposure of an account that is accessible 24 hours a day. Likewise, an account that is restricted to a particular machine or network can reduce the exposure of that user account to the hundreds of millions of machines worldwide. Similarly, an account that is accessible for a limited period of time, e.g. until the end of a class or contract, then the exposure of the account during the period before and after the limited period of time can be eliminated. Thus, the exposed surface area of accounts to attack can be significantly reduced using the disclosed technologies.

It is to be appreciated that while the embodiments disclosed herein have been presented primarily in the context of defined account rules being applied to limit login or other types of access requests, the technologies disclosed herein can be similarly applied to other contexts where similar functionality is utilized to limit or constrain access by a user account to resources of a remote service provider system or similar system.

Figure 6:
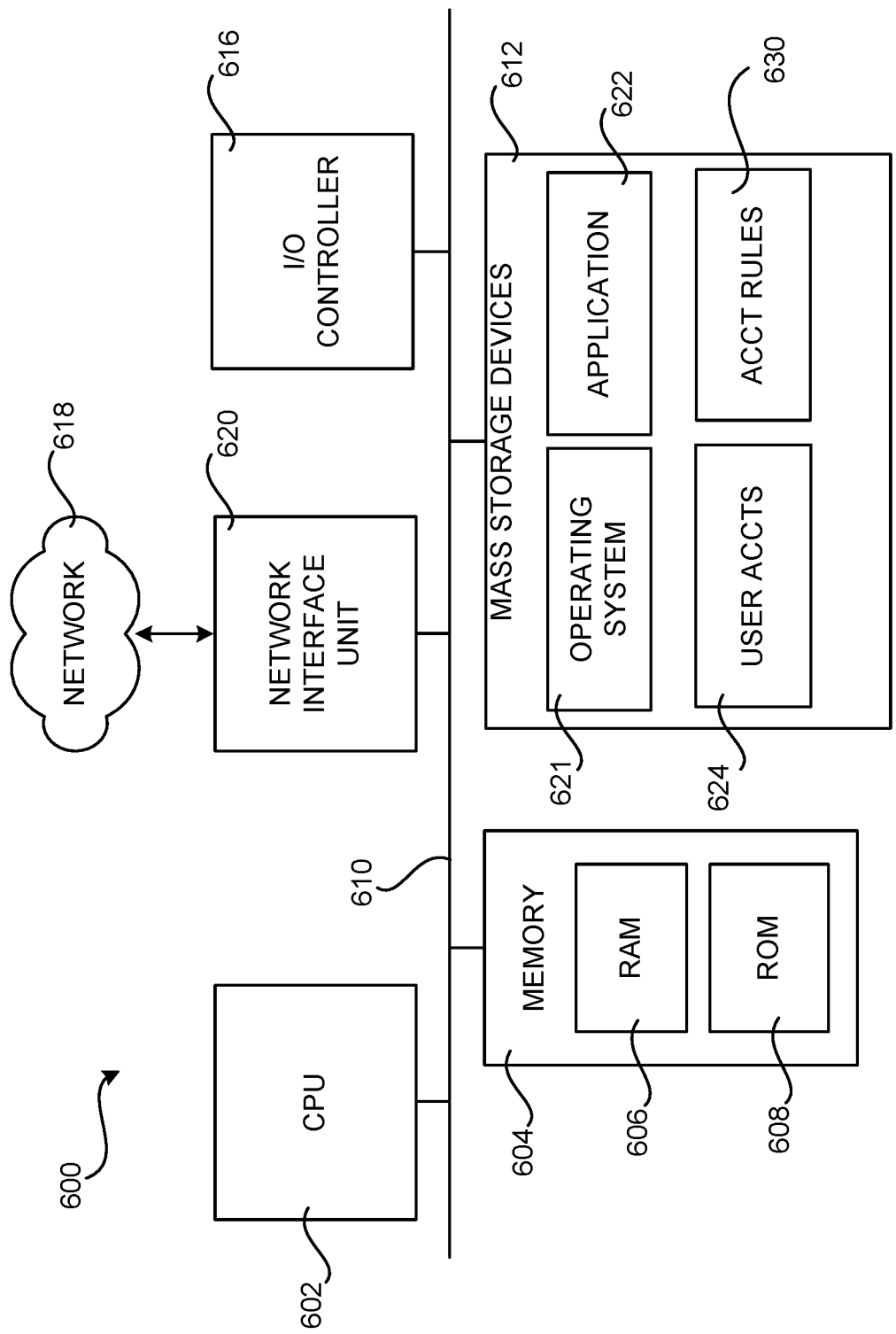
FIG. 6 is a computer architecture diagram showing an illustrative computer hardware and software architecture for a computing device, such as the computing devices shown in FIGS. 1, 2 and 3A, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the computing devices 104 or remote service provider system 120 illustrated in FIG. 1 or some or all of the components of the remote service provider systems 200 and 300 illustrated in FIGS. 2 and 3A and described above, which are capable of executing the various software components described above.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the user account data 624 and account rules store 626. The user account data 624 and account rules 626 can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
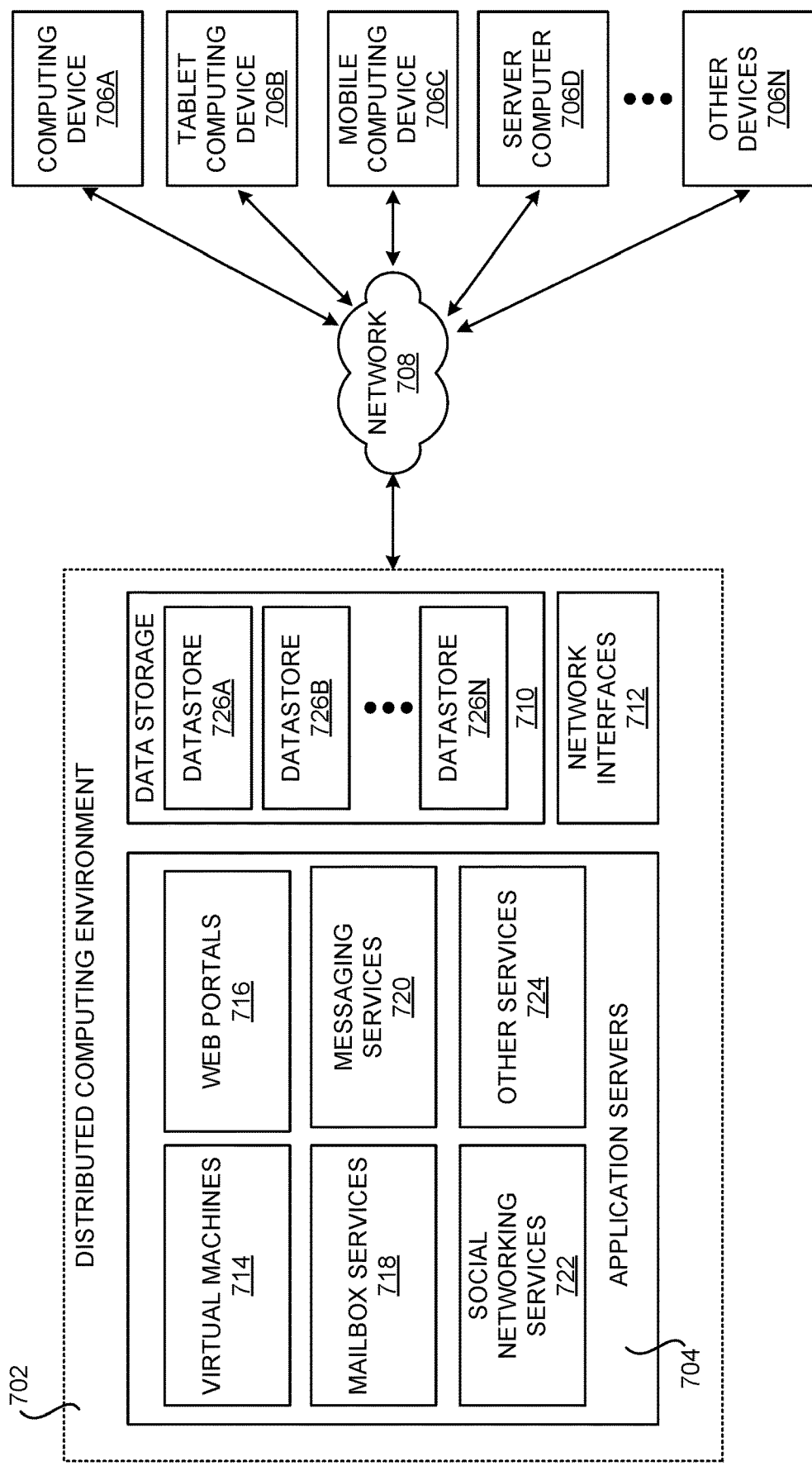
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources provided by one or more remote service provider systems, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/ or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
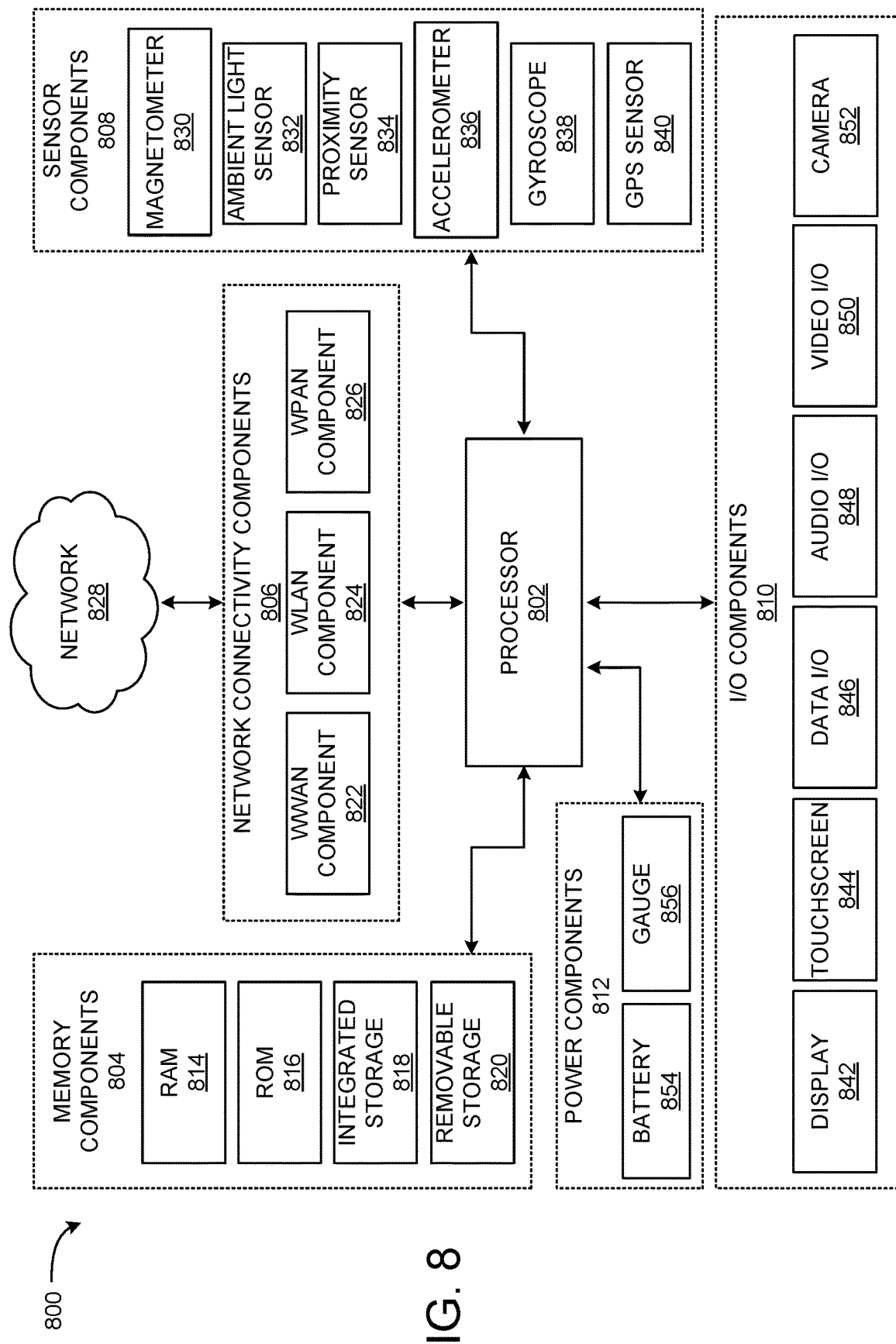
FIG. 8 is a computer architecture diagram illustrating a computing device architecture for a computing device, such as the computing devices shown in FIGS. 1, 2 and 3A, that is capable of implementing aspects of the technologies presented herein.

Turning now to FIG. 8, an illustrative computing device architecture 800 will be described for a computing device, such as the computing devices 104 or remote service provider system 120 illustrated in FIG. 1 or some or all of the components of the remote service provider systems 200 and 300 illustrated in FIGS. 2 and 3A, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the computing devices 104 or remote service provider system 120 illustrated in FIG. 1 or some or all of the components of the remote service provider systems 200 and 300 illustrated in FIGS. 2 and 3A and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1: A computer-implemented method for managing user accounts in a remote service provider system comprising: creating a rule for a user account, the rule including a permitted parameter corresponding to a property of account activity of the user account; monitoring the account activity of the user account; determining whether the property of the account activity of the user account is inconsistent with the permitted parameter of the rule; and disabling the user account if the property of the account activity of the user account is inconsistent with the permitted parameter of the rule.

Clause 2: The computer-implemented method of Clause 1, wherein: the permitted parameter of the rule comprises a permitted time period; the property of the account activity of the user account comprises a time of use; and determining whether the property of the account activity of the user account is inconsistent with the permitted parameter of the rule comprises determining whether the time of use of the user account is outside the permitted time period of the rule.

Clause 3: The computer-implemented method of Clause 2, wherein: the permitted time period comprises one or more of a start time, an end time, a recurrence definition, a days of the week definition, a start date, an end date, and a number of occurrences definition; the time of use property comprises one or more of a time of the account activity, a date of the account activity, a day of the week of the account activity, and a number of occurrences of the account activity; and determining whether the property of the account activity of the user account is inconsistent with the permitted parameter of the rule comprises determining whether at least one of: the time of the account activity is inconsistent with the start time or the end time, the date of the account activity is inconsistent with the recurrence definition, the start date, or the end date, the day of the week of the account activity is inconsistent with the days of the week definition, and the number of occurrences of the account activity is inconsistent with the number of occurrences definition.

Clause 4: The computer-implemented method of Clause 1, wherein: the permitted parameter of the rule comprises a physical parameter; the property of the account activity of the user account comprises a physical property of the account activity; and determining whether the property of the account activity of the user account is inconsistent with the permitted parameter of the rule comprises determining whether the physical property of use of the user account is outside the physical parameter of the rule.

Clause 5: The computer-implemented method of Clause 4, wherein: the physical parameter comprises one or more of a permitted geographic location, a permitted device, and a permitted network; the physical property of the account activity of the user account comprises one or more of a geographic location where the account activity occurs, a device used for the account activity, and a network used for the account activity; and determining whether the property of the account activity of the user account is inconsistent with the permitted parameter of the rule comprises determining whether at least one of: the geographic location where the account activity occurs is inconsistent with the permitted geographic location, the device used for the account activity is inconsistent with the permitted device, and the network used for the account activity is inconsistent with the permitted network.

Clause 6: The computer-implemented method of Clause 1, wherein: the permitted parameter of the rule comprises a permitted usage parameter; the property of the account activity of the user account comprises a usage property of the account activity; and determining whether the property of the account activity of the user account is inconsistent with the permitted parameter of the rule comprises determining whether the usage property of the account activity of the user account is outside the permitted usage parameter of the rule.

Clause 7: The computer-implemented method of Clause 6, wherein: the permitted usage parameter comprises one or more of a permitted application, a permitted data access, and a permitted domain; the usage property of the account activity of the user account comprises one or more of an application used for the account activity, a data access of the account activity, and a domain access of the account activity; and determining whether the property of the account activity of the user account is inconsistent with the permitted parameter of the rule comprises determining whether at least one of: the application used for the account activity is inconsistent with the permitted application, the data access of the account activity is inconsistent with the permitted data access, and the domain access of the account activity is inconsistent with the permitted domain.

Clause 8: A remote service provider system, the remote service provider system comprising: one or more processors; and at least one computer storage medium having computer executable instructions stored thereon which, when executed by the one or more processors, cause the one or more processors to: create a rule for a user account, the rule including a permitted parameter corresponding to a property of account activity of the user account; monitor the account activity of the user account; determine whether the property of the account activity of the user account is inconsistent with the permitted parameter of the rule; and disable the user account if the property of the account activity of the user account is inconsistent with the permitted parameter of the rule.

Clause 9: The remote service provider system of Clause 8, wherein: the permitted parameter of the rule comprises a permitted time period; the property of the account activity of the user account comprises a time of use; and the operation to determine whether the property of the account activity of the user account is inconsistent with the permitted parameter of the rule comprises an operation to determine whether the time of use of the user account is outside the permitted time period of the rule.

Clause 10: The remote service provider system of Clause 9, wherein: the permitted time period comprises one or more of a start time, an end time, a recurrence definition, a days of the week definition, a start date, an end date, and a number of occurrences definition; the time of use property comprises one or more of a time of the account activity, a date of the account activity, a day of the week of the account activity, and a number of occurrences of the account activity; and the operation to determine whether the property of the account activity of the user account is inconsistent with the permitted parameter of the rule comprises an operation to determine whether at least one of: the time of the account activity is inconsistent with the start time or the end time, the date of the account activity is inconsistent with the recurrence definition, the start date, or the end date, the day of the week of the account activity is inconsistent with the days of the week definition, and the number of occurrences of the account activity is inconsistent with the number of occurrences definition.

Clause 11: The remote service provider system of Clause 8, wherein: the permitted parameter of the rule comprises a physical parameter; the property of the account activity of the user account comprises a physical property of the account activity; and the operation to determine whether the property of the account activity of the user account is inconsistent with the permitted parameter of the rule comprises an operation to determine whether the physical property of use of the user account is outside the physical parameter of the rule.

Clause 12: The remote service provider system of Clause 11, wherein: the physical parameter comprises one or more of a permitted geographic location, a permitted device, and a permitted network; the physical property of the account activity of the user account comprises one or more of a geographic location where the account activity occurs, a device used for the account activity, and a network used for the account activity; and the operation to determine whether the property of the account activity of the user account is inconsistent with the permitted parameter of the rule comprises an operation to determine whether at least one of: the geographic location where the account activity occurs is inconsistent with the permitted geographic location, the device used for the account activity is inconsistent with the permitted device, and the network used for the account activity is inconsistent with the permitted network.

Clause 13: The remote service provider system of Clause 8, wherein: the permitted parameter of the rule comprises a permitted usage parameter; the property of the account activity of the user account comprises a usage property of the account activity; and the operation to determine whether the property of the account activity of the user account is inconsistent with the permitted parameter of the rule comprises an operation to determine whether the usage property of the account activity of the user account is outside the permitted usage parameter of the rule.

Clause 14: The remote service provider system of Clause 13, wherein: the permitted usage parameter comprises one or more of a permitted application, a permitted data access, and a permitted domain; the usage property of the account activity of the user account comprises one or more of an application used for the account activity, a data access of the account activity, and a domain access of the account activity; and the operation to determine whether the property of the account activity of the user account is inconsistent with the permitted parameter of the rule comprises an operation to determine whether at least one of: the application used for the account activity is inconsistent with the permitted application, the data access of the account activity is inconsistent with the permitted data access, and the domain access of the account activity is inconsistent with the permitted domain.

Clause 15: A computer storage medium having computer executable instructions stored thereon which, when executed by one or more processors, cause the processors to execute a method for managing user accounts in a remote service provider system, the method comprising: creating a rule for a user account, the rule including a permitted parameter corresponding to a property of account activity of the user account; monitoring the account activity of the user account; determining whether the property of the account activity of the user account is inconsistent with the permitted parameter of the rule; and disabling the user account if the property of the account activity of the user account is inconsistent with the permitted parameter of the rule.

Clause 16: The computer storage medium of Clause 15, wherein: the permitted parameter of the rule comprises a permitted time period; the property of the account activity of the user account comprises a time of use; and the operation to determine whether the property of the account activity of the user account is inconsistent with the permitted parameter of the rule comprises an operation to determine whether the time of use of the user account is outside the permitted time period of the rule.

Clause 17: The computer storage medium of Clause 16, wherein: the permitted time period comprises one or more of a start time, an end time, a recurrence definition, a days of the week definition, a start date, an end date, and a number of occurrences definition; the time of use property comprises one or more of a time of the account activity, a date of the account activity, a day of the week of the account activity, and a number of occurrences of the account activity; and determining whether the property of the account activity of the user account is inconsistent with the permitted parameter of the rule comprises determining whether at least one of: the time of the account activity is inconsistent with the start time or the end time, the date of the account activity is inconsistent with the recurrence definition, the start date, or the end date, the day of the week of the account activity is inconsistent with the days of the week definition, and the number of occurrences of the account activity is inconsistent with the number of occurrences definition.

Clause 18: The computer storage medium of Clause 15, wherein: the permitted parameter of the rule comprises a physical parameter; the property of the account activity of the user account comprises a physical property of the account activity; and determining whether the property of the account activity of the user account is inconsistent with the permitted parameter of the rule comprises determining whether the physical property of use of the user account is outside the physical parameter of the rule.

Clause 19: The computer storage medium of Clause 18, wherein: the physical parameter comprises one or more of a permitted geographic location, a permitted device, and a permitted network; the physical property of the account activity of the user account comprises one or more of a geographic location where the account activity occurs, a device used for the account activity, and a network used for the account activity; and determining whether the property of the account activity of the user account is inconsistent with the permitted parameter of the rule comprises an operation to determine whether at least one of: the geographic location where the account activity occurs is inconsistent with the permitted geographic location, the device used for the account activity is inconsistent with the permitted device, and the network used for the account activity is inconsistent with the permitted network.

Clause 20: The computer storage medium of Clause 15, wherein: the permitted parameter of the rule comprises one or more of a permitted application, a permitted data access, and a permitted domain; the property of the account activity of the user account comprises one or more of an application used for the account activity, a data access of the account activity, and a domain access of the account activity; and determining whether the property of the account activity of the user account is inconsistent with the permitted parameter of the rule comprises determining whether at least one of: the application used for the account activity is inconsistent with the permitted application, the data access of the account activity is inconsistent with the permitted data access, and the domain access of the account activity is inconsistent with the permitted domain.

Based on the foregoing, it should be appreciated that a remote service provider system has been disclosed that improves security by limiting access to and by user accounts to resources of the remote service provider system. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for managing user accounts in a remote service provider system comprising:
   creating a rule for a user account, the rule including a parameter corresponding to a property of login attempts to the user account, the parameter defining a predefined schedule of reoccurring time periods when the login attempts are permitted;
   determining that the property of a new login attempt to the user account is inconsistent with the parameter based on at least one of a date or a time of the new login attempt being outside the reoccurring time periods; and
   based on the determination that the property of the new login attempt to the user account is inconsistent with the parameter, rejecting the new login attempt to the user account.

2. The computer-implemented method of claim 1, wherein the reoccurring time periods include a start time and an end time that reoccurs daily.

3. The computer-implemented method of claim 1, wherein the reoccurring time periods include a start time and an end time that reoccurs weekly.

4. The computer-implemented method of claim 1, wherein the reoccurring time periods include a start time and an end time that reoccurs monthly.

5. The computer-implemented method of claim 1, wherein the reoccurring time periods include a start time and an end time that reoccurs yearly.

6. A remote service provider system, the remote service provider system comprising:
   one or more processors; and
   at least one computer storage medium having computer executable instructions stored thereon which, when executed by the one or more processors, cause the one or more processors to:
      create a rule for a user account, the rule including a parameter corresponding to a property of login attempts to the user account, the parameter defining a predefined schedule of reoccurring time periods when the login attempts are permitted;
      determine that the property of a new login attempt to the user account is inconsistent with the parameter based on at least one of a date or a time of the new login attempt being outside the reoccurring time periods; and
      based on the determination that the property of the new login attempt to the user account is inconsistent with the parameter, reject the new login attempt to the user account.

7. The remote service provider system of claim 6, wherein the reoccurring time periods include a start time and an end time that reoccurs daily.

8. The remote service provider system of claim 6, wherein the reoccurring time periods include a start time and an end time that reoccurs weekly.

9. The remote service provider system of claim 6, wherein the reoccurring time periods include a start time and an end time that reoccurs monthly.

10. The remote service provider system of claim 6, wherein the reoccurring time periods include a start time and an end time that reoccurs yearly.

11. A computer storage medium having computer executable instructions stored thereon which, when executed by one or more processors, cause the one or more processors to perform operations comprising:
   creating a rule for a user account, the rule including a parameter corresponding to a property of login attempts to the user account, the parameter defining a predefined schedule of reoccurring time periods when the login attempts are permitted;
   determining that the property of a new login attempt to the user account is inconsistent with the parameter based on at least one of a date or a time of the new login attempt being outside the reoccurring time periods; and
   based on the determination that the property of the new login attempt to the user account is inconsistent with the parameter, rejecting the new login attempt to the user account.

12. The computer storage medium of claim 11, wherein the reoccurring time periods include a start time and an end time that reoccurs daily.

13. The computer storage medium of claim 11, wherein the reoccurring time periods include a start time and an end time that reoccurs weekly.

14. The computer storage medium of claim 11, wherein the reoccurring time periods include a start time and an end time that reoccurs monthly.

15. The computer storage medium of claim 11, wherein the reoccurring time periods include a start time and an end time that reoccurs yearly.

* * * * *